(12) United States Patent
Oleson (10) Patent No.: US 8,783,771 B2
(45) Date of Patent: Jul. 22, 2014

(54) EXTENDABLE SEAT PAN ASSEMBLY WITH COMFORT SPRING

(75) Inventor: Michael L. Oleson, Parkland, FL (US)

(73) Assignee: BE Aerospace, Inc., Wellington, FL (US)

( * ) Notice: Subject to any disclaimer, the term of this patent is extended or adjusted under 35 U.S.C. 154(b) by 315 days.

(21) Appl. No.: 13/301,278

(22) Filed: Nov. 21, 2011

(65) Prior Publication Data
US 2013/0127227 A1    May 23, 2013

(51) Int. Cl.
*B60N 2/02* (2006.01)
*A47C 1/032* (2006.01)

(52) U.S. Cl.
USPC .................. 297/318; 297/216.15; 297/342

(58) Field of Classification Search
USPC ......... 297/312, 317, 318, 341, 342, 343, 337, 297/344.1, 344.11, 216.15, 216.16, 322
See application file for complete search history.

(56) References Cited

U.S. PATENT DOCUMENTS

| | | | | |
|---|---|---|---|---|
| 6,170,915 | B1* | 1/2001 | Weisz | 297/452.5 |
| 7,192,087 | B2* | 3/2007 | Adragna et al. | 297/284.11 |
| 7,390,060 | B2* | 6/2008 | Kristen | 297/343 |
| 7,648,115 | B2* | 1/2010 | Lambert et al. | 248/429 |
| 7,780,230 | B2* | 8/2010 | Serber | 297/216.15 |
| 8,042,867 | B2* | 10/2011 | Meister et al. | 297/216.15 |
| 8,439,543 | B2* | 5/2013 | Tanaka et al. | 362/547 |
| 8,573,691 | B2* | 11/2013 | Masutani | 297/216.15 |
| 2003/0025371 | A1* | 2/2003 | Veneruso | 297/322 |
| 2005/0151405 | A1* | 7/2005 | Dowty et al. | 297/317 |

\* cited by examiner

*Primary Examiner* — David R Dunn
*Assistant Examiner* — Timothy J Brindley
(74) *Attorney, Agent, or Firm* — Shumaker, Loop & Kendrick, LLP (57) ABSTRACT

An extendable seat pan assembly configured to be supported on spaced side walls of a seat frame and including a seat pan frame having spaced frame rails retained longitudinally parallel to and adjacent the side walls, and a seat pan slidably supported on the frame rails and defining an opening therethough spanned by a spring assembly including a plurality of springs. An aircraft passenger seat including an extendable seat pan assembly.

18 Claims, 9 Drawing Sheets

EXTENDABLE SEAT PAN ASSEMBLY WITH COMFORT SPRING

TECHNICAL FIELD AND BACKGROUND OF THE INVENTION

1. Field of the Invention

The present invention relates generally to a seat pan for a seat such as an aircraft seat, and more particularly, to an extendable seat pan including a comfort spring assembly that meets or exceeds compressive spine loading requirements for Federal Aviation Regulation qualified seating systems.

2. Background of the Invention

Aircraft seats are required to achieve high performance levels during crash testing, such as during weight loading and compressive spine loading testing. Accordingly, to withstand such high loads, conventional aircraft seats typically utilize rigid, stationary seat pans. Such seat pans, while strong, sacrifice occupant comfort and require independent mechanisms for extending the length of the seat bottom, thus increasing cost, complexity and weight.

Accordingly, to provide improved passenger comfort while meeting or exceeding Federal Aviation Regulation seating system requirements, an improved extendable seat pan assembly including a spring assembly is provided herein.

BRIEF SUMMARY OF THE INVENTION

In one aspect, an extendable seat pan assembly configured to be mounted to a seat frame is provided herein.

In another aspect, the seat pan assembly includes a spring assembly for occupant comfort.

In another aspect, the seat pan is movable to provide longer leg support for a seated occupant.

In another aspect, the seat pan extends within a seat pan frame via slides mounted beneath and to the sides of the seat pan.

In another aspect, the seat pan frame is attached via linkage to the bottom of an associated backrest below the backrest pivot, such that as the backrest is reclined the links push the seat pan frame forward and upward via a cam profile.

In another aspect, seat pan frame rails contact rollers rotatably mounted to the seat frame such that the frame automatically moves upward and forward along a predetermined profile as the backrest is reclined.

In another aspect, the seat pan assembly is configured to limit compressive spine loading in an occupant during crash testing prescribed by the Federal Aviation Administration (FAA) within the Federal Aviation Regulations.

In another aspect, the seat pan assembly meets or exceeds the FAA's compressive spine loading requirements for a Federal Aviation Regulation qualified seating system (ref 14G spine loading for FAR Part 25 & 15G spine loading for FAR Part 23).

To achieve the foregoing and other aspects and advantages, in one embodiment an extendable seat pan assembly configured to be supported on spaced side walls of a seat frame is provided herein. The seat pan assembly includes a seat pan frame having spaced frame rails each retained longitudinally parallel to and adjacent one of the side walls of the seat frame, and a seat pan supported on the frame rails and slidable relative thereto in a direction longitudinally parallel to the frame rails, the seat pan defining an opening therethough spanned by a spring assembly including a plurality of springs.

In a further embodiment, the plurality of springs comprise elongated sinuous wire springs arranged generally parallel to one another and independently supported within a spring frame.

In a further embodiment, the spring frame includes spaced bars, such as first and second spaced bars, secured to opposing sides of the seat pan adjacent the opening.

In a further embodiment, the spring assembly includes at least one stringer transversely bridging and interconnecting the plurality of elongated sinuous wire springs and maintaining lateral spacing therebetween.

In a further embodiment, the seat pan frame includes spaced forward and rear cross members interconnecting the spaced frame rails, and the seat pan defines a downward extending flange along a rear edge thereof that contacts the rear cross member to limit forward extension of the seat pan relative to the seat pan frame.

In a further embodiment, the seat pan assembly includes spaced slides mounted under and to the sides of the seat pan that are guidingly retained within guides attached alongside the frame rails.

In a further embodiment, the spaced side walls rotatably support rollers at their forward ends, and the frame rails each have a cam profile along an underside of their forward end that travels on the rollers such that the cam profile moves the seat pan frame up and forward as the seat pan frame moves forward relative to the side walls.

In a further embodiment, the seat pan laterally overlaps the frame rails and is generally planar and full of holes to reduce weight.

In another embodiment, an aircraft passenger seat having an extendable seat pan is provided herein and includes a seat frame including a backrest pivotably attached to spaced seat bottom side walls, and an extendable seat pan assembly supported on the spaced side walls, the seat pan assembly including a seat pan frame having spaced frame rails each retained longitudinally parallel to and adjacent one of the side walls of the seat frame, and a seat pan supported on the frame rails and slidable relative thereto in a direction longitudinally parallel to the frame rails, the seat pan defining an opening therethough spanned by a spring assembly including a plurality of springs.

In a further embodiment, the spaced side walls rotatably support rollers at their forward ends, and the frame rails each have a cam profile along an underside of their forward end that travels on the rollers such that the cam profile moves the seat pan frame up and forward as the backrest is reclined.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, an extendable seat pan assembly and an aircraft passenger seat frame compatible with the seat pan assembly are shown. It should be understood that the seat frame shown is intended to generically represent any seat frame, as the seat pan assembly is compatible with a variety of seat frame configurations. Only the backrest and side wall portions of the seat frame have been shown for clarity of the disclosure, as additional portions of the seat frame are independent of the support, movement and operation of the seat pan assembly. Although not shown, the seat pan assembly can support a cushion placed thereon. The seat pan assembly may additionally serve as an attachment point for the seat cushion and upholstery.

The extendable seat pan assembly is shown throughout the figures at reference numeral 20, and generally includes a seat pan frame 22 slidingly supporting a seat pan 24 thereon. Referring to FIGS. 1-4, the seat pan frame 22 is pivotably linked to a backrest 26 of the seat frame 28 through links 30, 32 such that the seat pan frame 22 is linked in motion with the backrest 26. Specifically, the seat pan frame 22 selectively moves between rearward and forward positions as the backrest 26 selectively moves between upright and reclined/lie flat positions, respectively. The backrest 26 may drive the movement of the seat, pan frame 22 or vice versa.

Figure 1:
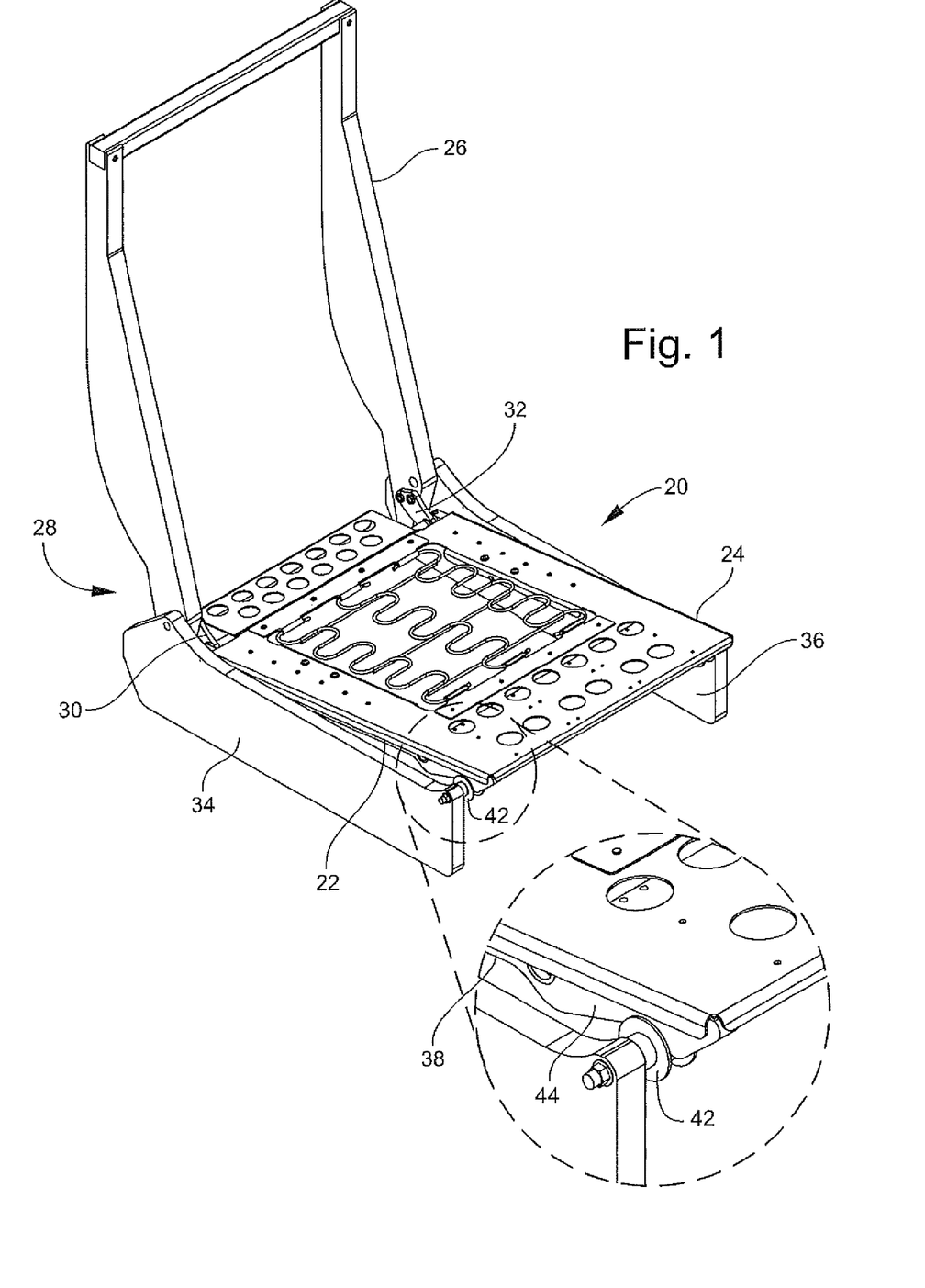
FIG. 1 is a perspective view of a seat including an extendable seat pan assembly shown in the retraced position.
Figure 2:
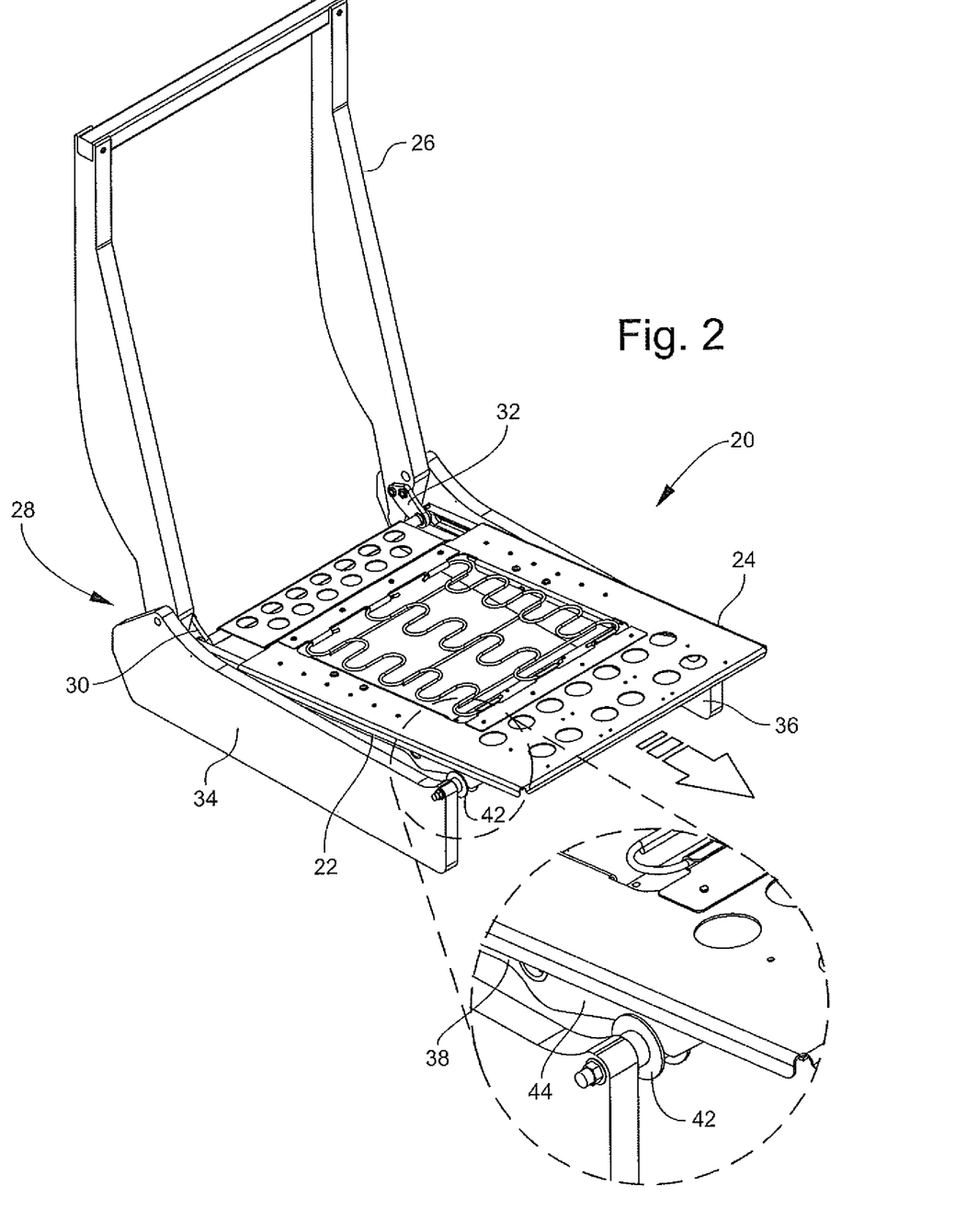
FIG. 2 is a perspective view of the seat of FIG. 1 showing the seat pan in the extended position.

Referring to FIG. 1, when the backrest 26 is in the fully upright position the seat pan frame 22 is in the fully rearward position. Independent of the position of the seat pan frame 22, the seat pan 24 is shown in the retracted position. The seat pan frame 22 is supported by and between spaced side walls 34, 36 of the seat frame 28. As described in detail below, the seat pan frame 22 includes spaced frame rails 38, 40 retained longitudinally parallel to and adjacent the side walls 34, 36. Rearward ends of the frame rails 38, 40 are attached to and supported by the backrest 26 through the links 30, 32, while the forward ends of the frame rails 38, 40 travel on rollers 42 rotatably carried on forward ends of the side walls 34, 36.

Each frame rail 38, 40 defines a cam 44 on the underside of its forward end that travels on a roller 42 as the seat pan frame 22 moves in the forward and backward directions. The cam 44 has a predetermined profile (e.g., ramp) that causes the front of the seat pan 24 to also raise as the seat pan frame 22 moves forward. Alternative cam profiles can be practiced, for example alternative ramp slopes, to achieve different seat pan 24 positions. The cam 44 may be machined into the frame rail 38, 40.

Referring to FIG. 2, again the backrest 26 is shown in the upright position and the seat pan frame 22 is shown in the rearward position, however, the seat pan 24 is shown in the extended position. Thus, the seat pan 24 is configured to move independent of the movement of the seat pan frame 22. The seat pan 24 may be extended to provide longer leg support for a seated occupant. Extension/retraction of the seat pan 24 may be achieved manually or may be powered and controlled through seat controls as known to those skilled in the art.

Figure 3:
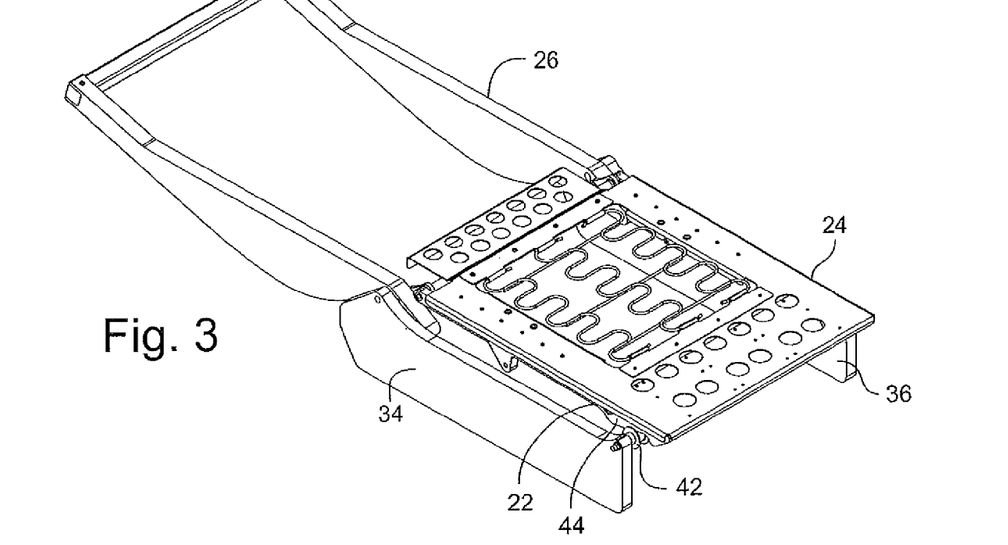
FIG. 3 is a perspective view of the seat of FIG. 1 showing the seat back reclined, the seat pan frame forward and raised, and the seat pan retracted.
Figure 4:
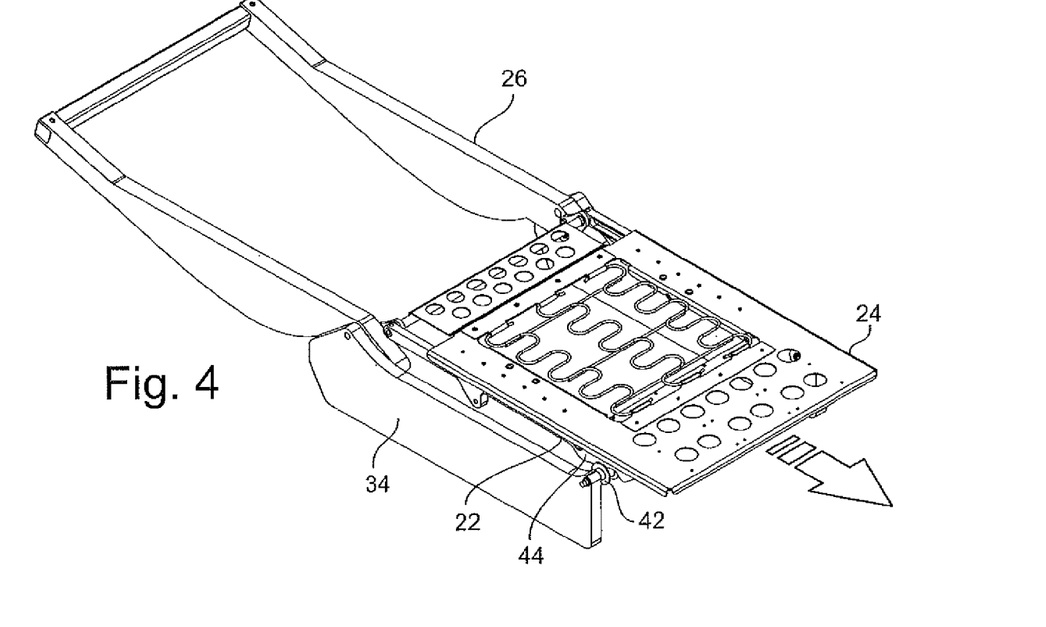
FIG. 4 is a perspective view of the seat of FIG. 1 showing the seat back reclined, the seat pan frame forward and raised, and the seat pan extended.

Referring to FIG. 3, as the seatback 26 is reclined the seat pan frame 22 is pushed forward and the front end of the seat pan 24 is raised to achieve a substantially horizontal bed and lie flat sleeping position. As shown in FIG. 4, again the seat pan 24 is configured to extend independent of the movement of the seat pan frame 22. The seat pan 24 can be extended, for example, to lengthen the bed and/or adjust the position of the comfort spring assembly.

Figure 5:
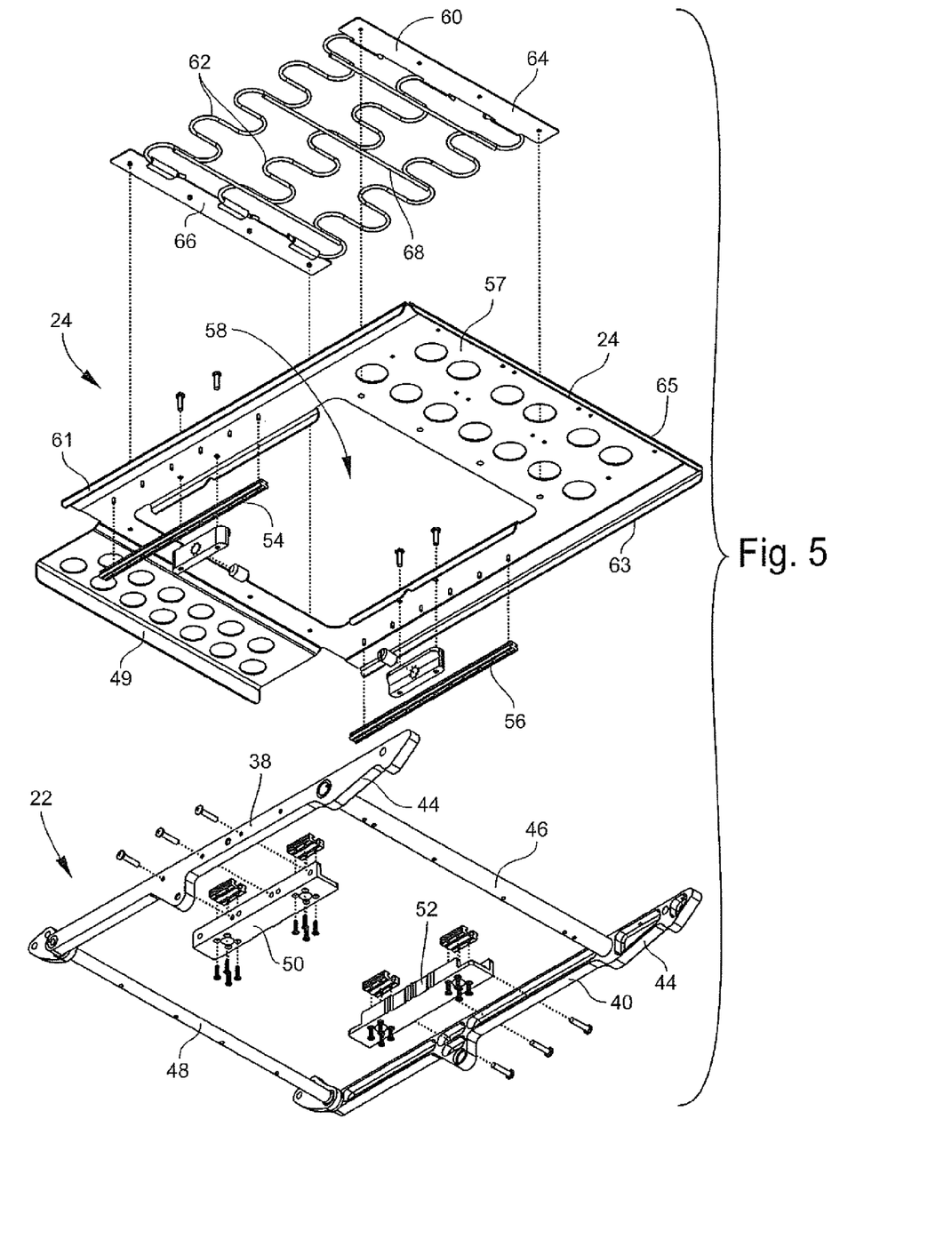
FIG. 5 is an exploded view of the seat pan assembly shown from below.
Figure 6:
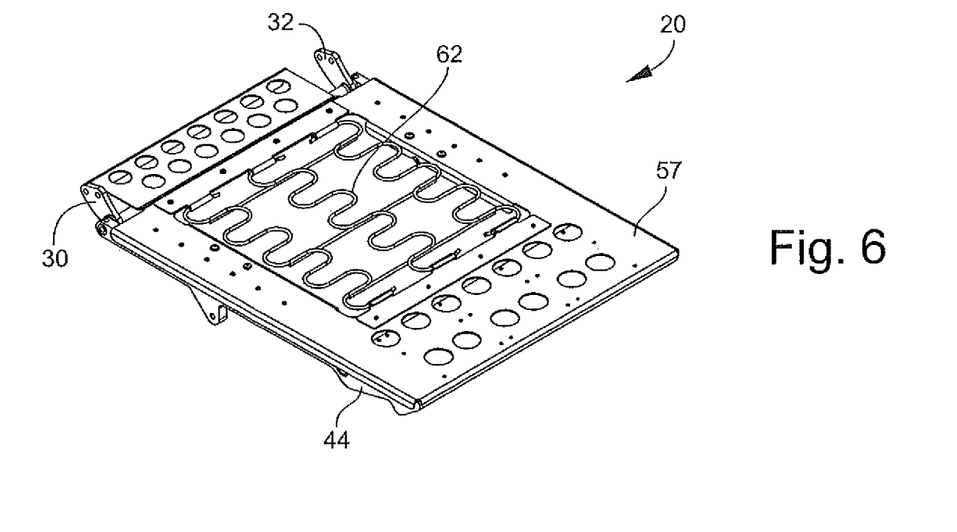
FIG. 6 is an assembled view of the seat pan assembly shown from above.
Figure 7:
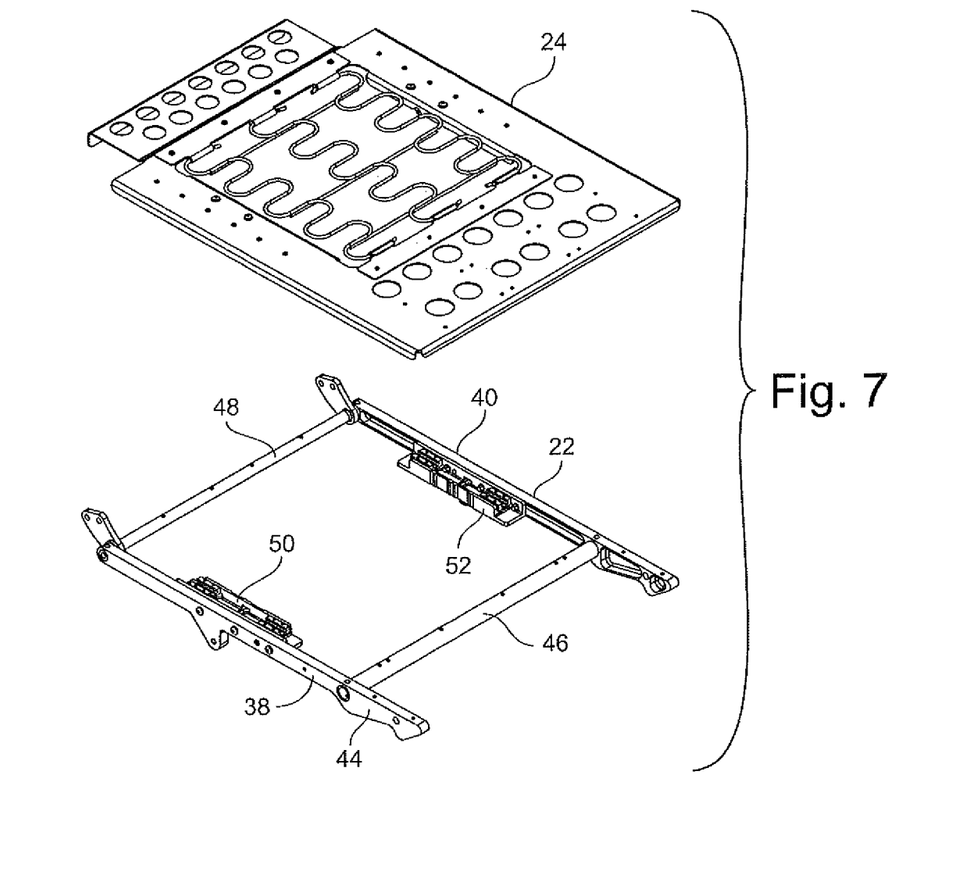
FIG. 7 is an exploded view of the seat pan assembly shown from above.
Figure 8:
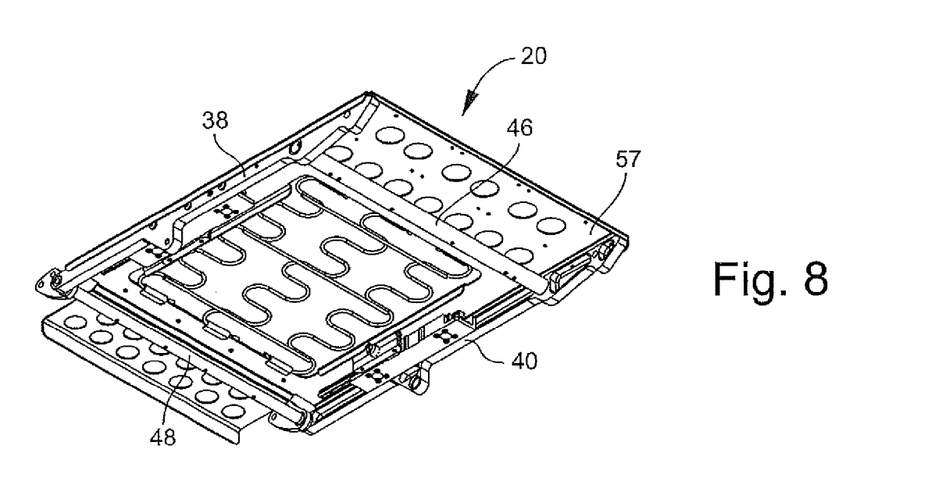
FIG. 8 is an assembled view of the seat pan assembly shown from below.
Figure 9:
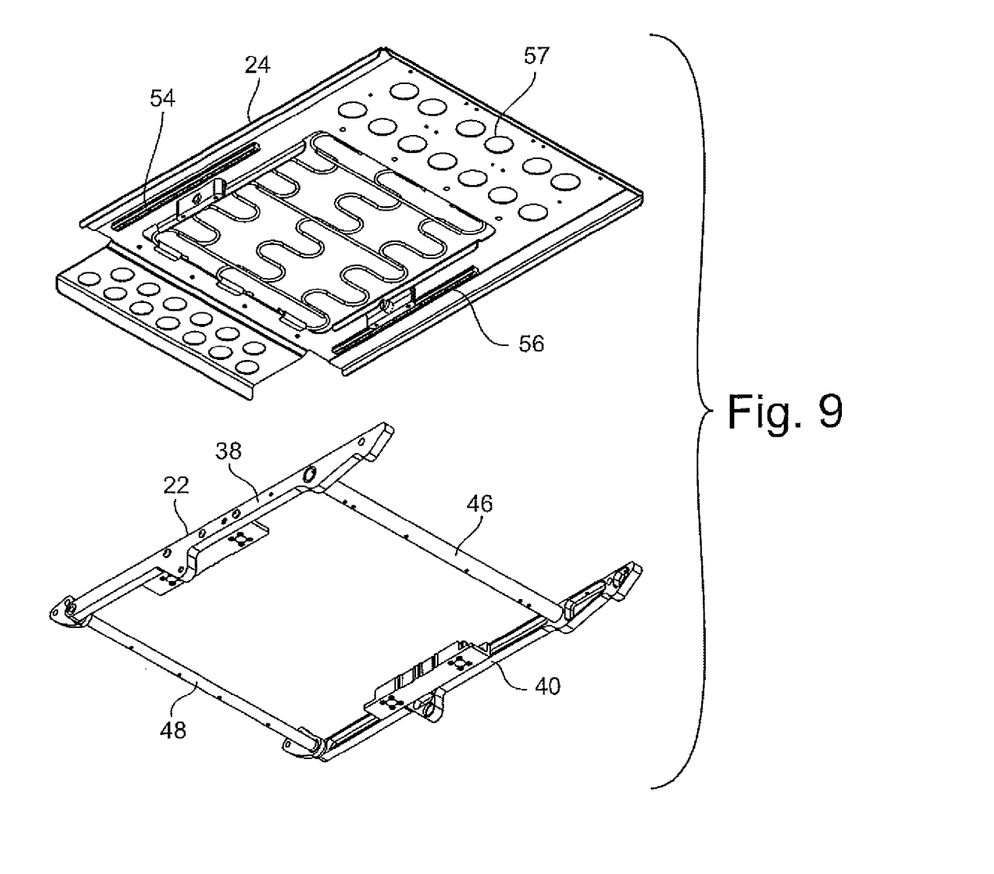
FIG. 9 is an exploded view of the seat pan assembly shown from below.

Referring to FIG. 5, the seat pan frame 22 generally includes the spaced frame rails 38, 40 defining the cam surfaces 44 that guide the movement of the front of the seat pan 24, front and rear spaced cross members 46, 48 that interconnect and maintain the lateral spacing of the frame rails 38, 40, and guide assemblies 50, 52 that guidingly retain slides 54, 56 on the underside of the seat pan 24. The guide assemblies 50, 52 can be attached to the inner faces of the frame rails 38, 40 using conventional fasteners. The slides 54, 56 slidingly engage and are supported within the guide assemblies 50, 52. The slides 54, 56 are preferably loaded through an end of the guide assemblies 50, 52 to prevent the seat pan 24 from being removed by being pulled vertically upward. The rear cross member 48 can engage a downward flange 49 along the rear edge of the seat pan 24 when the seat pan is in the fully extended position to limit forward extension.

The seat pan 24 generally includes a planar frame 57 that can be full of holes to reduce weight. The frame 57 defines an opening 58 generally centered within the frame 57 that receives a comfort spring assembly 60. The opening 58 as shown comprises a substantial portion of the surface area of the frame 57. The frame 57 defines the downward extending flange 49 along the rear side, downward extending flanges 61, 63 along the sides that overlap the frame rails 38, 40, and a downward extending flange 65 along the front edge. The frame 57 may further include openings therethrough for securing the spring assembly 60 within the opening 58. The slides 54, 56 are attached spaced apart to the underside of the frame 57 in alignment with tracks of the underlying guide assemblies 50, 52.

The spring assembly 60 generally includes a plurality of elongate sinuous wire springs 62 arranged generally parallel to one another and independently supported within a spring frame including spaced apart front and rear bars 64, 66. The bars 64, 66 are secured to the seat pan 24 such that the springs 62 substantially span the entirety of the opening 58. The springs 62 are interconnected through a plurality of spaced-apart wire stringers 68 that stabilize the lateral movement of the springs 62 and prevent the springs 62 from twisting upon a load being exerted on the spring assembly 60. The springs 62 may have alternative shapes, arrangements and numbers of springs.

The spring assembly 60 may be arranged within the opening as shown, or may alternatively be arranged such that the springs 62 transversely bridge the opening in a uniform manner. The springs 62 may be secured to the bars 64, 66 using crimped sleeves, wire clips or the like. The springs 62 may bridge the opening 58 at a height above the height of the set pan 24 so as to provide a spring effect when a downward pressure is applied thereto.

Referring to FIGS. 6-9, the sides of the seat pan 24 overlap the frame rails 38, 40, and the spring assembly 60 is aligned over the opening through the seat pan frame 22. The front and rear cross members 46, 48 may be spaced such that the spring assembly 60 is not positioned over either cross member 46, 48 in either the retracted or extended position of the seat pan 24 to avoid contact between the springs 62 and the cross members 46, 48.

Figures 10, 11:
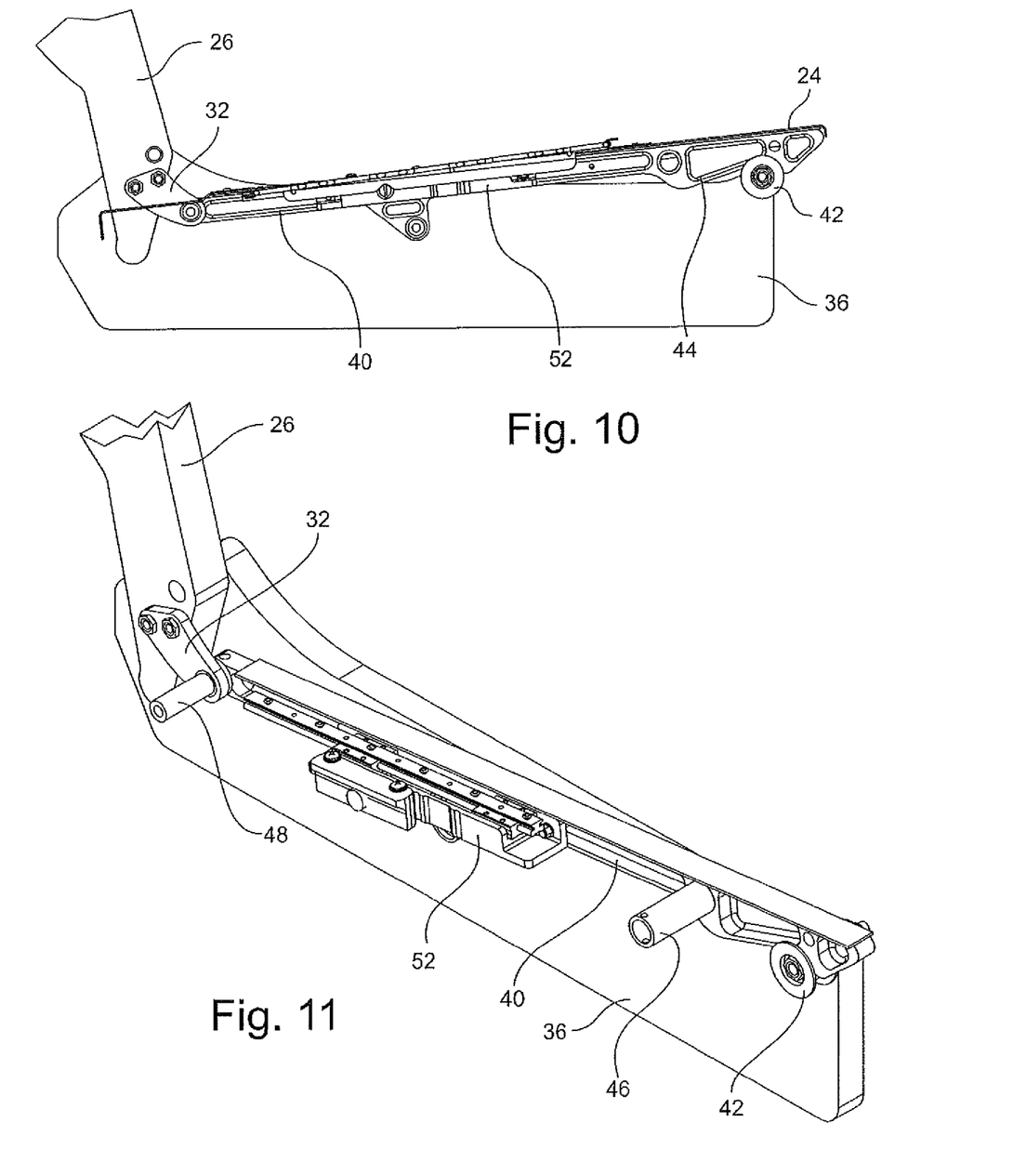
FIG. 10 is a sectional view through the seat pan assembly shown with the seat pan retracted.
FIG. 11 is a perspective view of a frame rail, slide and guide with the slide retracted.

Referring to FIG. 10, a sectional view through about the longitudinal centerline of the seat illustrates the forward and rear flanges of the seat pan 24 and cam profile of the left-side frame rail 40. The seat pan frame 22 is shown in the rearward position with the roller 42 positioned at the base of the ramp such that the forward edge of the seat pan 24 is in the lowered position. The seat pan 24 is shown in the retracted position with the rear flange rearwardly spaced from the rear cross member 48.

Referring to FIG. 11, the seat pan 24 is shown removed from the left side slide 56 to illustrate the retention of the slide 56 within its respective guide assembly 52. As shown, the slide 56 has a generally I-beam sectional profile to prevent the slide 56 from being pulled upwardly from its guide assembly 52.

Figure 12:
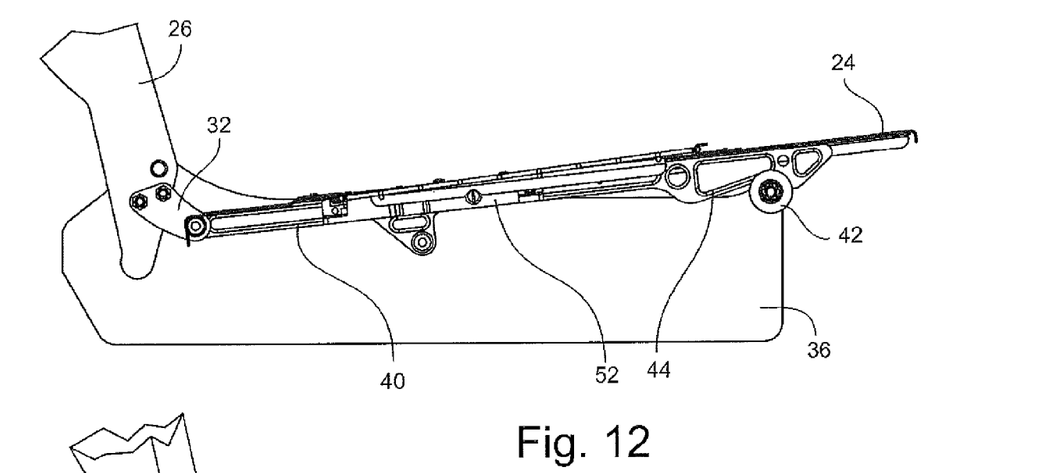
FIG. 12 is a sectional view through the seat pan assembly shown with the seat pan extended.
Figure 13:
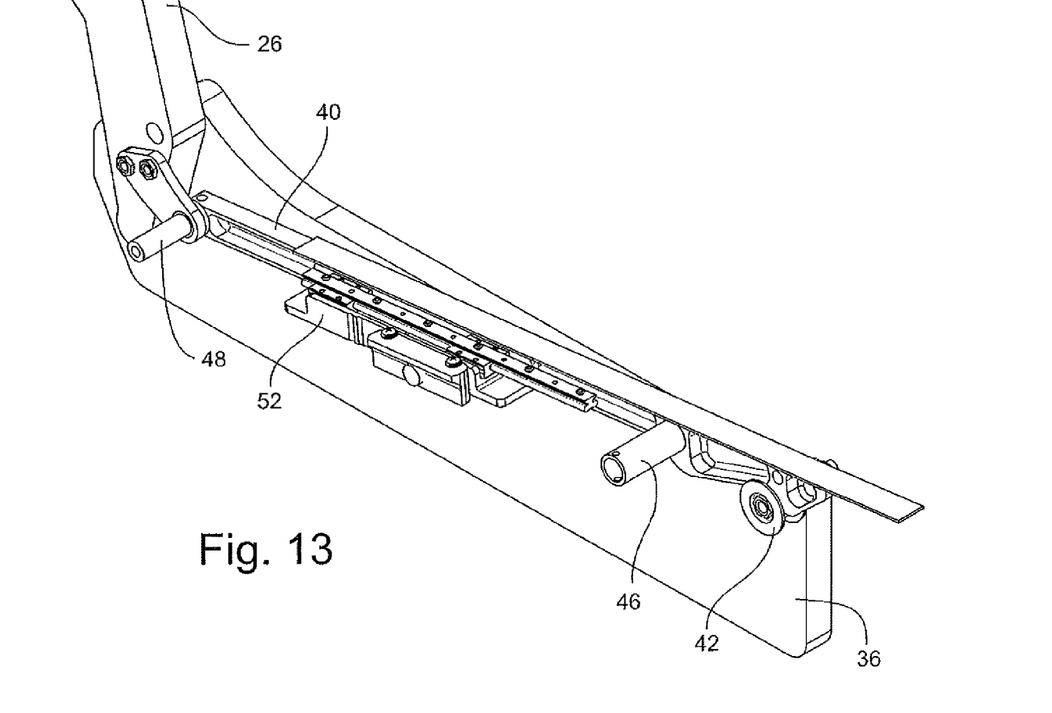
FIG. 13 is a perspective view of a frame rail, slide and guide with the slide extended.

Referring to FIG. 12, the sectional view through about the longitudinal centerline of the seat illustrates the forward and rear flanges of the seat pan 24 and cam profile of the left-side frame rail 40. The seat pan frame 22 is shown in the rearward position with the roller 42 positioned at the base of the ramp such that the forward edge of the seat pan 24 is in the lowered position. The seat pan 24 is shown in the extended position with the rear flange adjacent or engaging the rear cross member 48. Referring to FIG. 13, the slide 56 is shown in a forward position within its respective guide assembly 52.

Figure 14:
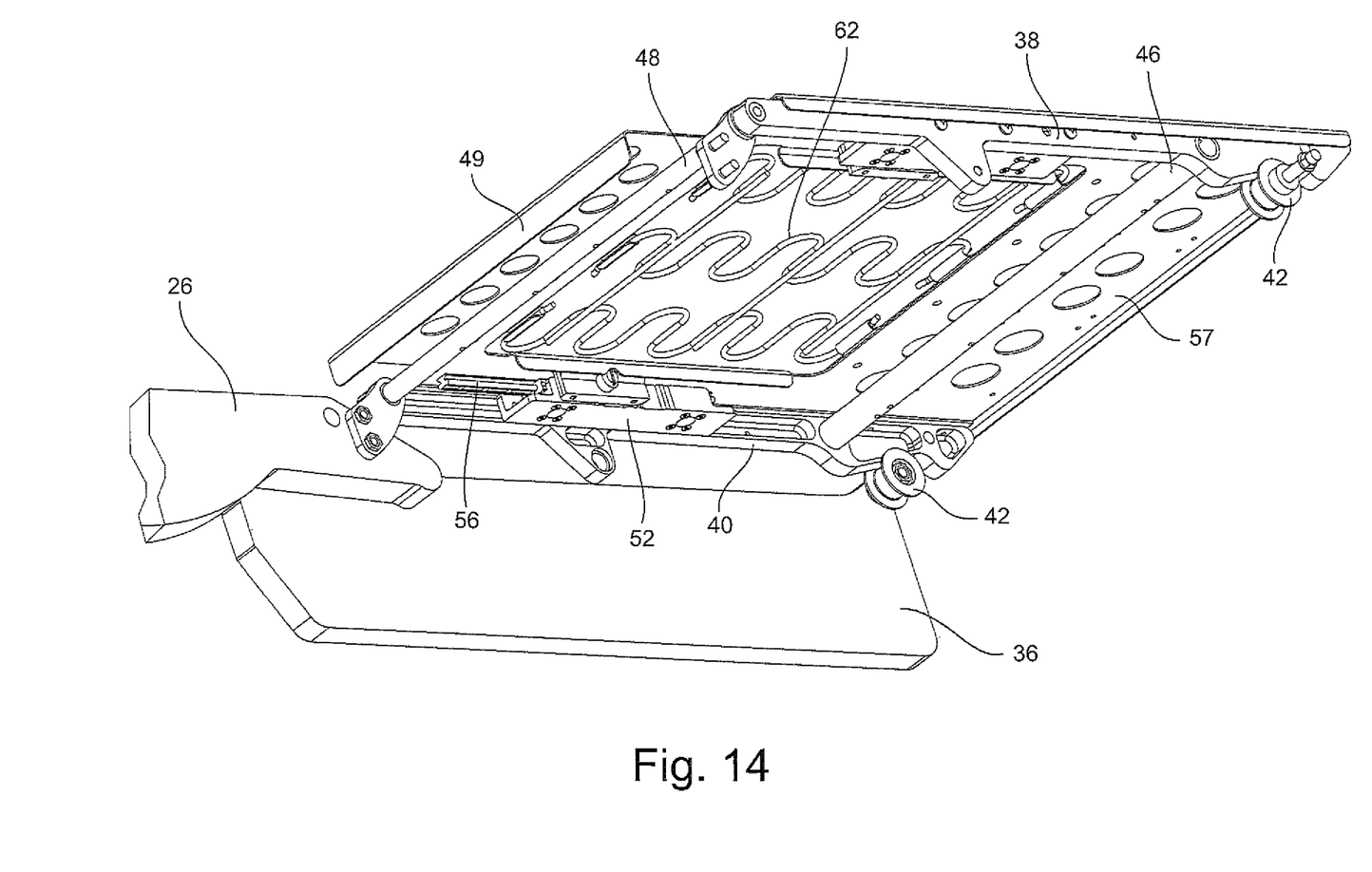
FIG. 14 is a view of a portion of the assembly shown from below.

Referring to FIG. 14, the seat pan frame 22 is shown in the forward position with the backrest 26 is in the reclined position. The seat pan frame 22 moves forward and upward relative to the side wall 36 as the roller 42 moves up the ramp of the cam 44. The seat pan 24 in the position shown is substantially horizontal and raised in comparison to the slightly angled and lowered seat pan position shown in FIGS. 10 and 12.

The extendable seat pan assembly 20 and aircraft seat frame including the same described herein is configured to limit compressive spine loading in an occupant during crash testing prescribed by the Federal Aviation Administration (FAA) within the Federal Aviation Regulations. The seat pan assembly 20 meets or exceeds the FAA's compressive spine loading requirements for a Federal Aviation Regulation qualified seating system (ref 14G spine loading for FAR Part 25 & 15G spine loading for FAR Part 23).

The foregoing description provides embodiments of the invention by way of example only. It is envisioned that other embodiments may perform similar functions and/or achieve similar results. Any and all such equivalent embodiments and examples are within the spirit and scope of the present invention and are intended to be covered by the appended claims.

What is claimed is:

1. An extendable seat pan assembly configured to be supported on spaced side walls of a seat frame, comprising:
    a seat pan frame having spaced frame rails each retained longitudinally parallel to and adjacent one of the side walls of the seat frame;
    a seat pan supported on the frame rails and slidable relative thereto in a direction longitudinally parallel to the frame rails, the seat pan defining an opening therethough spanned by a spring assembly including a plurality of springs; and
    the spaced side walls rotatably supporting rollers at their forward ends, the frame rails each having a cam profile along an underside of their forward end that travels on the rollers such that the cam profile moves the seat pan frame up and forward as the seat pan frame moves forward relative to the side walls.

2. The extendable seat pan assembly according to claim 1, wherein the plurality of springs comprise elongated sinuous wire springs arranged generally parallel to one another and independently supported within a spring frame.

3. The extendable seat pan assembly according to claim 2, wherein the spring frame includes spaced bars.

4. The extendable seat pan assembly according to claim 2, further comprising at least one stringer transversely bridging and interconnecting the plurality of elongated sinuous wire springs and maintaining lateral spacing therebetween.

5. The extendable seat pan assembly according to claim 1, wherein the seat pan frame further comprises spaced forward and rear cross members interconnecting the spaced frame rails.

6. The extendable seat pan assembly according to claim 5, wherein the seat pan defines a downward extending flange along a rear edge thereof that contacts the rear cross member to limit forward extension of the seat pan relative to the seat pan frame.

7. The extendable seat pan assembly according to claim 1, further comprising spaced slides mounted under and to the sides of the seat pan that are guidingly retained within guides attached alongside the frame rails.

8. The extendable seat pan assembly according to claim 1, wherein the seat pan frame is attached via links to a bottom end of a backrest below a backrest pivot.

9. The extendable seat pan assembly according to claim 1, wherein the seat pan laterally overlaps the frame rails and is generally planar and includes a top surface having a plurality of holes.

10. An aircraft passenger seat having an extendable seat pan, comprising:
    a seat frame including a backrest pivotably attached to spaced seat bottom side walls; and
    an extendable seat pan assembly supported on the spaced side walls, the seat pan assembly including a seat pan frame having spaced frame rails each retained longitudinally parallel to and adjacent one of the side walls of the seat frame, and a seat pan supported on the frame rails and slidable relative thereto in a direction longitudinally parallel to the frame rails, the seat pan defining an opening therethough spanned by a spring assembly including a plurality of springs, and the spaced side walls rotatably supporting rollers at their forward ends the frame rails each having a cam profile along an underside of their forward end that travels on the rollers such that the cam profile moves the seat pan frame up and forward as the seat pan frame moves forward relative to the side walls.

11. The aircraft passenger seat according to claim 10, wherein the plurality of springs comprise elongated sinuous wire springs arranged generally parallel to one another and independently supported within a spring frame.

12. The aircraft passenger seat according to claim 11, wherein the spring frame includes spaced bars.

13. The aircraft passenger seat according to claim 11, further comprising at least one stringer transversely bridging and interconnecting the plurality of elongated sinuous wire springs and maintaining lateral spacing therebetween.

14. The aircraft passenger seat according to claim 11, wherein the seat pan frame further comprises spaced forward and rear cross members interconnecting the frame rails.

15. The aircraft passenger seat according to claim 14, wherein the seat pan defines a downward extending flange along a rear edge thereof that contacts the rear cross member to limit forward extension of the seat pan relative to the seat pan frame.

16. The aircraft passenger seat according to claim 10, further comprising spaced slides mounted under and to the sides of the seat pan that are guidingly retained within guides attached alongside the frame rails.

17. The aircraft passenger seat according to claim 10, wherein the seat pan frame is attached via links to the bottom of the backrest.

18. The aircraft passenger seat according to claim 10, wherein the seat pan laterally overlaps the frame rails and is generally planar and includes a top surface having a plurality of holes.

\* \* \* \* \*